United States Patent
Beyer et al.

(10) Patent No.: US 7,698,260 B2
(45) Date of Patent: Apr. 13, 2010

(54) APPARATUS AND METHOD FOR HANDLING A LET BINDING

(75) Inventors: Kevin Scott Beyer, San Jose, CA (US); Edison Lao Ting, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 11/684,425

(22) Filed: Mar. 9, 2007

(65) Prior Publication Data

US 2008/0222101 A1 Sep. 11, 2008

(51) Int. Cl.
*G06F 17/30* (2006.01)
(52) U.S. Cl. .............................................. 707/3; 707/4
(58) Field of Classification Search ................... 707/3–4
See application file for complete search history.

(56) References Cited

U.S. PATENT DOCUMENTS

| | | | |
|---|---|---|---|
| 7,031,956 B1 | 4/2006 | Lee et al. | |
| 7,162,485 B2 | 1/2007 | Gottlob et al. | |
| 7,516,121 B2 * | 4/2009 | Liu et al. | 707/3 |
| 2004/0010752 A1 | 1/2004 | Chan et al. | 715/513 |
| 2005/0108209 A1 | 5/2005 | Beyer et al. | 707/3 |
| 2005/0289125 A1 | 12/2005 | Liu et al. | 707/3 |
| 2006/0235839 A1 * | 10/2006 | Krishnaprasad et al. | 707/4 |
| 2007/0174242 A1 | 7/2007 | Josifovski et al. | 707/3 |

OTHER PUBLICATIONS

Dario Colazzo, "Path Correctness for XML Queries: Characterization and Static Type Checking", Ph.D. Thesis, Jul. 2004.
"XQuery FLWOR Expressions" XQuery FLWOR, viewed Mar. 9, 2007. http://www.w3schools.com/xquery/xquery_flwor.asp.
"XPath Syntax" XPath Syntax, viewed Mar. 9, 2007. http://www.w3schools.com/wpath/wpath_syntax.asp.

* cited by examiner

*Primary Examiner*—Yicun Wu
*Assistant Examiner*—Huawen Peng
(74) *Attorney, Agent, or Firm*—Kunzler Needham Massey & Thorpe (57) ABSTRACT

An apparatus and method for handling a LET binding used in a WHERE clause of an XQuery FLWOR expression during an XML pivot join procedure. The disclosed apparatus and method enable an XML pivot join procedure to accurately process a query and return one or more qualifying documents. A logical expression within the WHERE clause is identified. Next steps of the logical expression are separated by logical operators. The LET binding is incorporated with each next step. The XQuery FLWOR expression is rewritten using the incorporations along with a FOR binding of the XQuery FLWOR expression to make a syntactically equivalent XPath query. Predicates of the LET binding may also be incorporated with the next steps, without altering the predicates.

5 Claims, 11 Drawing Sheets

APPARATUS AND METHOD FOR HANDLING A LET BINDING

CROSS-REFERENCES TO RELATED APPLICATIONS

This application is related to patent application Ser. No. 11/336,140 entitled "QUERY EVALUATION USING ANCESTOR INFORMATION" and filed on Jan. 20, 2006 for Edison, et al.

BACKGROUND OF THE INVENTION

1. Field of the Invention

This invention relates to XML pivot joins and more particularly relates to handling a LET binding used in a WHERE clause of an XQuery FLWOR expression during an XML pivot join procedure.

2. Description of the Related Art

XPath and XQuery are two common languages used to query an XML document. XPath is a path expression language for selecting data within XML documents. XQuery is a language for querying, transforming, and constructing XML data. An expression is a string of unicode characters which may be constructed from keywords, symbols, and operands. XPath allows expressions to be nested. XQuery uses XPath expression syntax to address specific parts of an XML document and is semantically similar to structured query language (SQL). The SQL-like XQuery syntax uses "For, Like, Where, Order by, and Return" clauses in a "FLWOR" expression.

XPath analyzes an XML document as an XML tree by representing each element of the XML document as a node in the XML tree. The XML tree may include parent-child nodes that directly correspond to the nested elements in the XML document. For more information regarding XPath and XQuery please visit their standards web pages which currently reside at http://www.w3.org/TR/xpath20/ and http://www.w3.org/TR/xquery/ respectively.

An XML pivot join procedure provides efficient filtering of XML documents that satisfy an XPath or XQuery expression. The XML pivot join procedure uses an XML index scan to filter an index for each leg in an expression. For example, given an XPath expression, "/a/b[(c=5) AND (d=6)]," and a collection of XML documents, an index will be filtered by performing an XML index scan on the index relating to "/a/b/c=5" (the first leg) as well as on the index relating to "/a/b/d=6" (the second leg). Each index will contain information from a qualifying XML document, which information includes the qualifying path, the XML document where the path is located, the node identification of the path, and the value received from the XML document. The XML pivot join procedure will "AND" the index scans thereby advancing the scan of one index based on the information of another.

Several structures are created during the XML pivot join procedure. From the query, a query tree is generated that describes the query in tree representation. Also, a paths table is created during the XML pivot join procedure to describe every unique path in the collection of XML documents. By nature, the paths table includes paths that are both relevant and non-relevant to the query. So, to summarize the relevant paths, a paths tree is created. Entries from the paths table are matched against the query tree and qualifying paths are combined to form the paths tree. A match graph is constructed by finding paths in the paths tree that match steps in the query tree. These structures are used at strategic points throughout the XML pivot join algorithm to identify qualifying documents.

XML pivot joining from an XPath expression produces expected results. However, XML pivot joining from an XQuery FLWOR expression may not produce expected results. That is, when pivot joining from an XQuery FLWOR expression, the information to be propagated may not compute properly. For example, given the XQuery FLWOR expression "FOR $a in doc( )//a LET $b in $a//b WHERE $b/c=5 and $b/d=6 RETURN $a," the LET binding $b describes the sequence of one or more "b" nodes underneath "a" nodes of a document. So, the XQuery FLWOR expression searches for "c" nodes and "d" nodes under any of the "b" nodes that are under "a." In other words, the "c=5" match and the "d=6" match does not necessarily need to be under the same "b" node.

Detrimentally, certain XML documents that, in theory, should satisfy the XQuery FLWOR expression do not. When the XML pivot join algorithm applies the "AND" operation on the indexes, evaluation of the subsequent leg of the expression relies on the information obtained from the evaluation of the prior leg. So, if the information obtained from evaluating the prior leg results in "Document 1" satisfying the "/a/b/c=5" path, then the subsequent expression would rely on that information to find the "/a/b/d=6" path by starting at the node location for the path "/a/b." This necessitates having the "c=5" match and the "d=6" match under the same "b" node. But, when evaluating an XQuery FLWOR expression, the "c=5" match and the "d=6" match are not required to be located under the same "b" node. The "c=5" match and the "d=6" match can be under different parent nodes to qualify a document; however, current implementations of the XML pivot join procedure exclude the document.

FIGS. 3 through 10 are provided as an example of the XML pivot join procedure. Using the XML documents in FIG. 3 and an XPath query: //x[.//v[b="b" and c="c"] and .//a="a"], a query tree (see FIG. 4) is constructed. A double bar represents a descendant axis and a single bar represents a child axis. A paths table (see FIG. 4) is also constructed. The paths table describes all the unique paths within the collection of XML documents in FIG. 3. To summarize all of the paths relevant to the query, a paths tree is created. The query tree facilitates parsing the XPath query into linear XPaths. The linear XPaths derived are //x[.//v[b="b"]], //x[.//v[c="c"]], and //x[.//a="a"].

Figure 4:
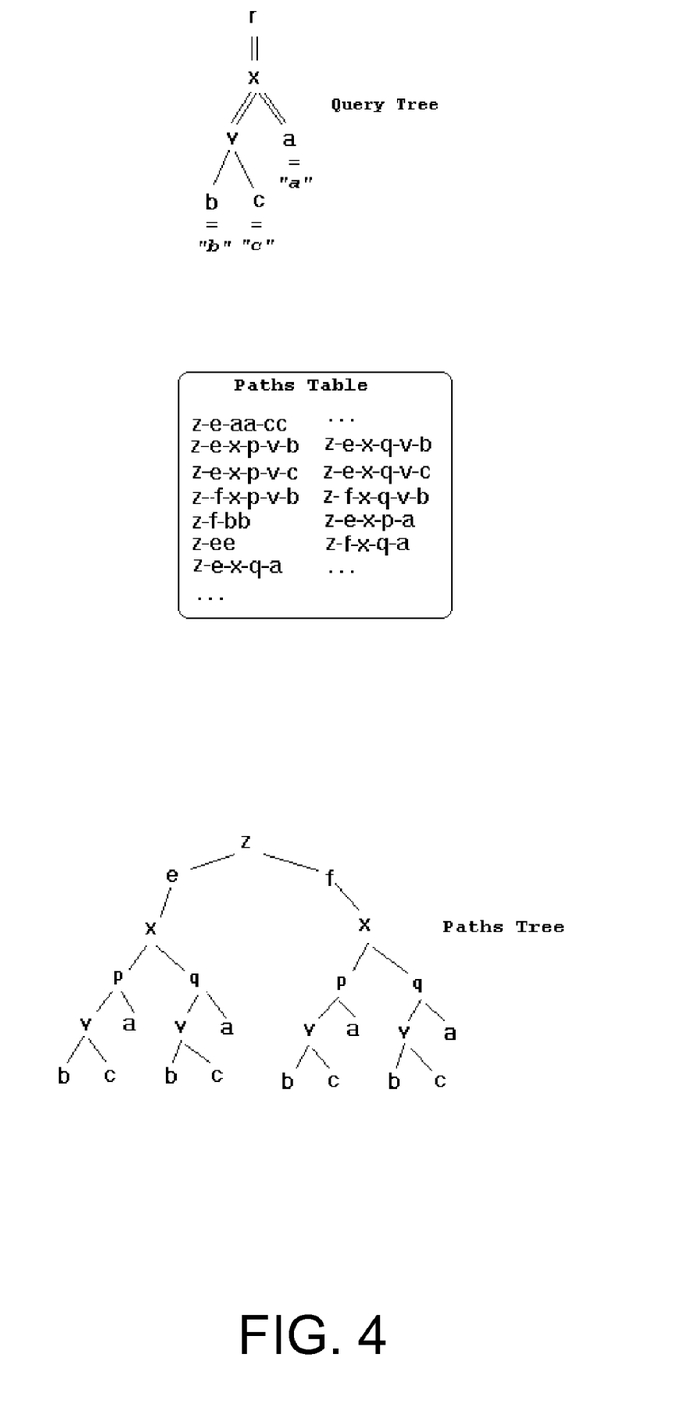
FIG. 4 is a diagram representing a query tree, paths table, and paths tree created during an XML pivot join procedure.

Paths in the paths table matching the linear XPaths derived from the query tree comprise the paths tree. Thus, the paths tree summarizes all the unique paths in the collection of XML documents that are relevant to the XPath query. XML index entries are created for each linear XPath in the XPath query. Each index entry includes a path, which is the unique path that matched the linear XPath; a value, which is the value of the last document node in the path; a document identifier, which is the document identifier of the XML documents that contains the path; and a node identifier, which is the identifier of the node in the XML document that is in the path.

Figure 5:
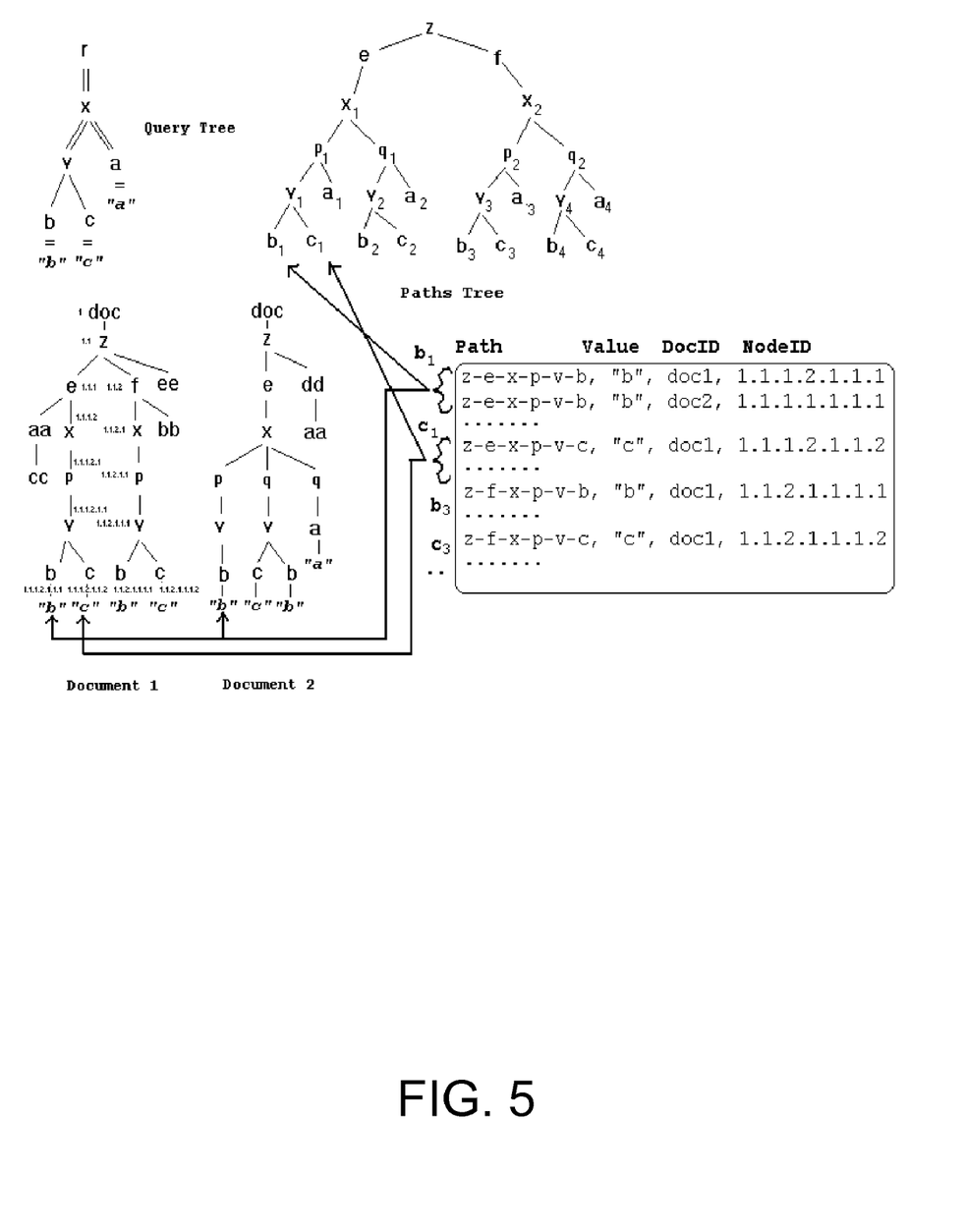
FIG. 5 is a diagram illustrating the working relationship of the query tree, paths tree, and XML documents.

FIG. 5 depicts the XML index entry's relations to the XML documents and paths of the paths tree. For the first entry, the path z-e-x-p-v-b describes the first matching (unique) path for the linear XPath //x/v/b. For discussion purposes, the labels within the path with numbers have been subscripted in FIG. 5 to show the unique instances of that label. For the linear XPath //x/v/b for example, there are a number of matching paths: z-e-x-p-v-b is the first matching path, so it is subscripted with "1"; the paths tree has the z-e-x-p-v-b path so it is subscripted as $z-e-x_1-p_1-v_1-b_1$. The second match for //x/ v/b is z-e-x-q-v-b, so it is subscripted as z-e-$x_1$-$q_1$-$v_2$-$b_2$. The "$v_2$" indicates that this path is the second unique path for "v," and "$b_2$" indicates that this path is the second unique path for "b."

From this point on, the paths that match a linear XPath will be referenced using the last subscripted label. For example, to refer to the path z-e-$x_1$-$p_1$-$v_1$-$b_1$ above, the reference will be to the "$b_1$" path. Likewise, for the path z-e-$x_1$-$q_1$-$v_2$-$b_2$, the reference will be to the "$b_2$" path.

The first entry in the XML index in FIG. 5 indicates that the "$b_1$" path has the value "b" at document 1 at nodeID 1.1.1.2.1.1.1. An explanation of nodeIDs may begin at document 1. Node "z" has nodeID 1.1. Node "e" has nodeID 1.1.1, node "x" has 1.1.1.2 (because node "aa" is 1.1.1.1). Node "p" has 1.1.1.2.1, node "v" has 1.1.1.2.1.1 and node "b" has 0.1.1.2.1.1.1. Note that nodeIDs are ordered, that is 1.1.1<1.1.2<1.1.2.1 and so on, and that parent nodeIDs are easily computed from any descendant. That is from "b," which has nodeID 1.1.1.2.1.1.1, the nodeID of "$x_1$" can be computed by truncating the nodeID from 7 digits to 4 digits (7 nodes along the path to the "b" document node, and 4 nodes along the path to the "x" document node). So, the nodeID of "$x_1$" is 1.1.1.2.

Note that for the "$b_1$" path, there are a number of XML index entries. The first "$b_1$" entry points to document 1, nodeID 1.1.1.2.1.1.1. The second "$b_1$" entry points to document 2 nodeID 1.1.1.1.1.1.1. This says that the indexes have found the "$b_1$" path in both document 1 and document 2. From here on, instead of showing the XML index entries and their paths and locations, the subscripted paths along the xml document paths will be shown (see FIG. 6).

Figure 6:
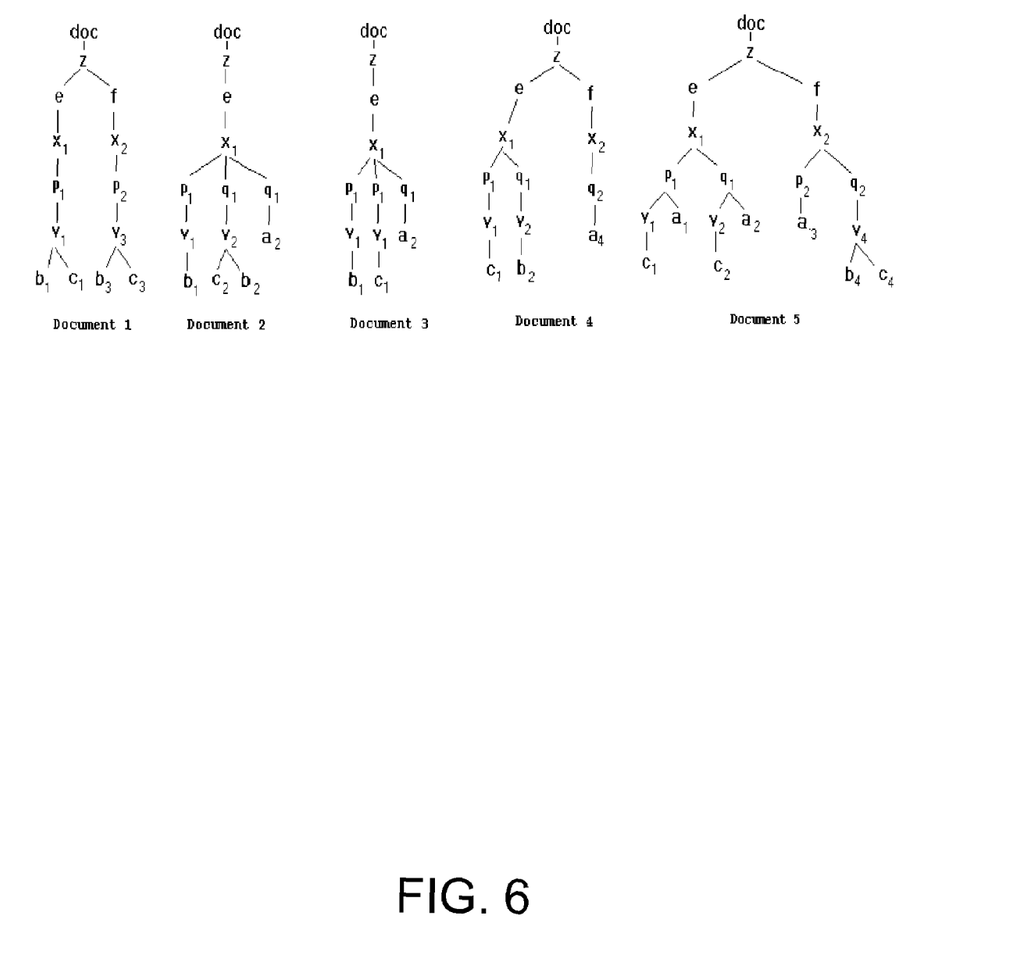
FIG. 6 is a diagram representing a collection of XML documents used in an XML pivot join procedure.

In FIG. 6, the matches for the linear XPath //x//v/b can easily be seen. There is a path "$b_1$" at document 1, "$b_3$" at document 1, "$b_1$" at document 2, and so on. For the linear XPath //x//v/c, there is a path "$c_1$" at document 1, "$c_1$" at document 1, "$c_1$" at document 2, and so on. For the linear XPath //x//a, there is a path "$a_2$" at document 2, "$a_2$" at document 3, "$a_4$" at document 4, and so on. Further referencing the way the algorithm advances the XML index scans will occur by saying that the "$b_1$" scan is currently at the first "$b_1$" in document 1, then at the first "$b_1$" at document 2 and so on. The XML pivot join procedure has one index scan open for each unique path. So, the "$b_1$" paths use one index scan, the "$c_1$" paths use one index scan, the "$b_2$" paths uses one index scan, and so on.

Figure 7:
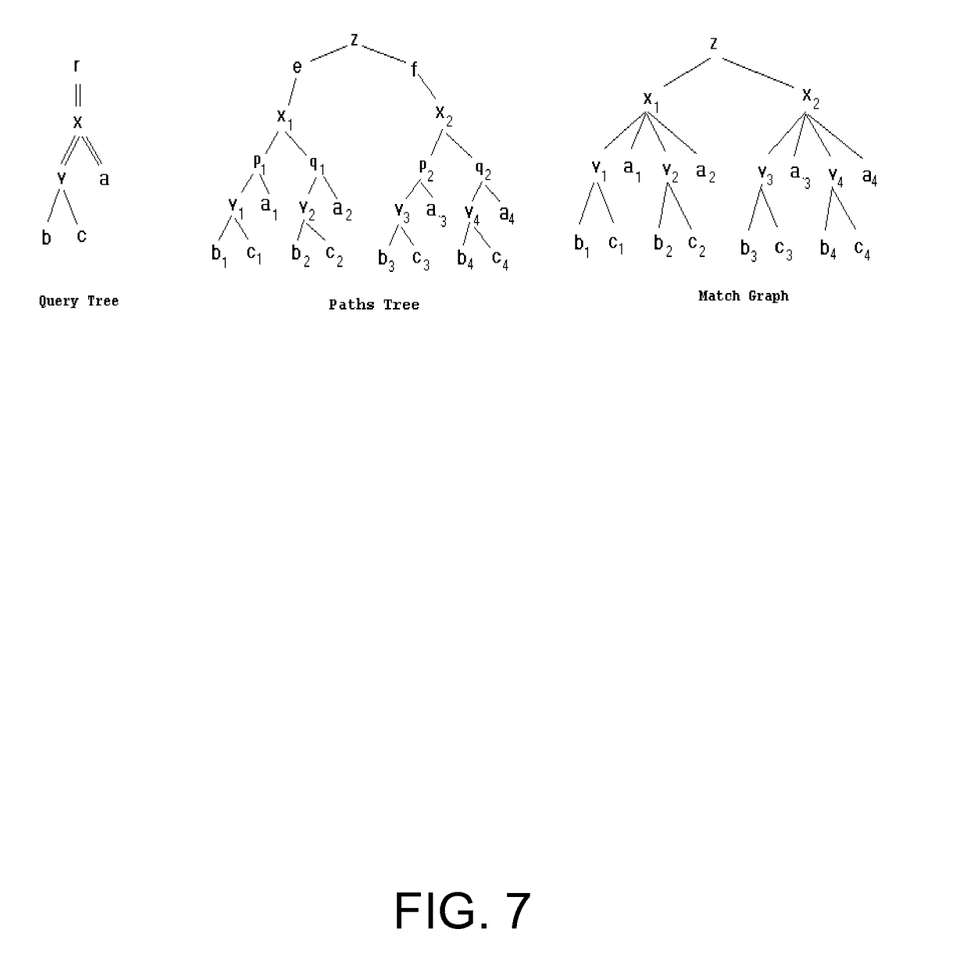
FIG. 7 is a diagram of a query tree, paths tree, and resulting match graph created in an XML pivot join procedure.

In FIG. 7, a query tree and a paths tree are used to construct a match graph. The match graph is constructed by finding matching paths in the paths tree with steps in the query tree. The "$b_1$" node in the match graph, for example, signifies the match between the "$b_1$" path in the paths tree with the "b" step in the query tree. The match graph is used to remember document and node locations while performing the XML index scans. For example, if the index scan for "$b_1$" is advanced and the index scan returns document 1, the location will be remembered, document 1 (and the nodeID of the "$b_1$" match) in the match graph node "$b_1$." The match graph node "$b_1$" is at location document 1.

A running example may be useful as it shows the XML pivot join procedure in detail. The following examples will show snapshots of the match graph and describe how the document locations are computed and how the index scans are advanced. The diagram of the xml documents in FIG. 6 will be used repetitively to help track what is being pointed to with the XML index scans.

Figure 8:
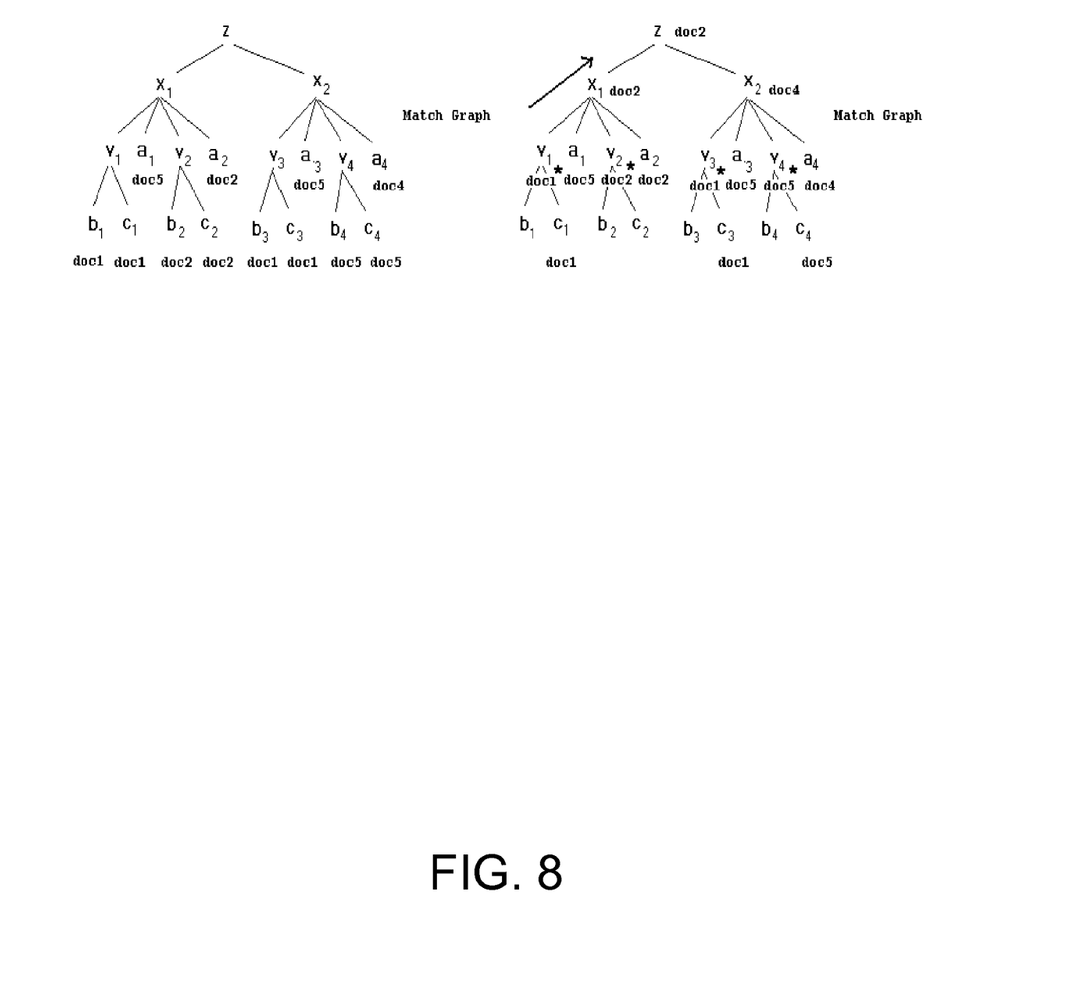
FIG. 8 is a diagram representing the functionality of the match graph during the XML pivot join procedure.

In FIG. 8, the progress of the match graph occurs from left to right. The leaves of the match graph correspond to the index scans. For the initial match graph on the left of FIG. 8, the "$b_1$" index scan is at "doc1." The "$c_1$" index scan is also at "doc1." The "$b_2$" index scan is at "doc2," the "$c_2$" index scan is at "doc2," and the "$a_1$" index scan is at "doc5." The locations for the index scans show that the first "$b_1$" path is at document 1, the first "$c_1$" path is at document 1, the first "$b_2$" path is at document 2, the first "$c_2$" path is at document 2, the first "$a_1$" path is at document 5, and so on.

In the match graph snapshot to the right, the location of "$b_1$" has been truncated to the level of "$v_1$." It is apparent that this matched the nodeID computed from the truncation of the nodeID of "$c_1$" to the level of "$v_1$." This match is depicted in location with an asterisk (*) at "$v_1$." This says that a "$b_1$" path and a "$c_1$" path are found to have the same "$v_1$" ancestor at document 1, as can be seen in FIG. 6. A similar occurrence is seen for "$v_2$." To compute for the location of "$x_1$", the minimum locations of (a1, a2) and minimum locations of (v1, v2) are taken, then the maximum of these minimums is taken. So "$x_1$" is at doc2. To compute for the location of "z," take the minimum of (x1 and x2), so "z" is at doc2. Note that neither "$x_1$" nor "z" has the asterisk because "$x_1$" does not have a "v" match and an "a" match under the same "x" match.

Figure 9:
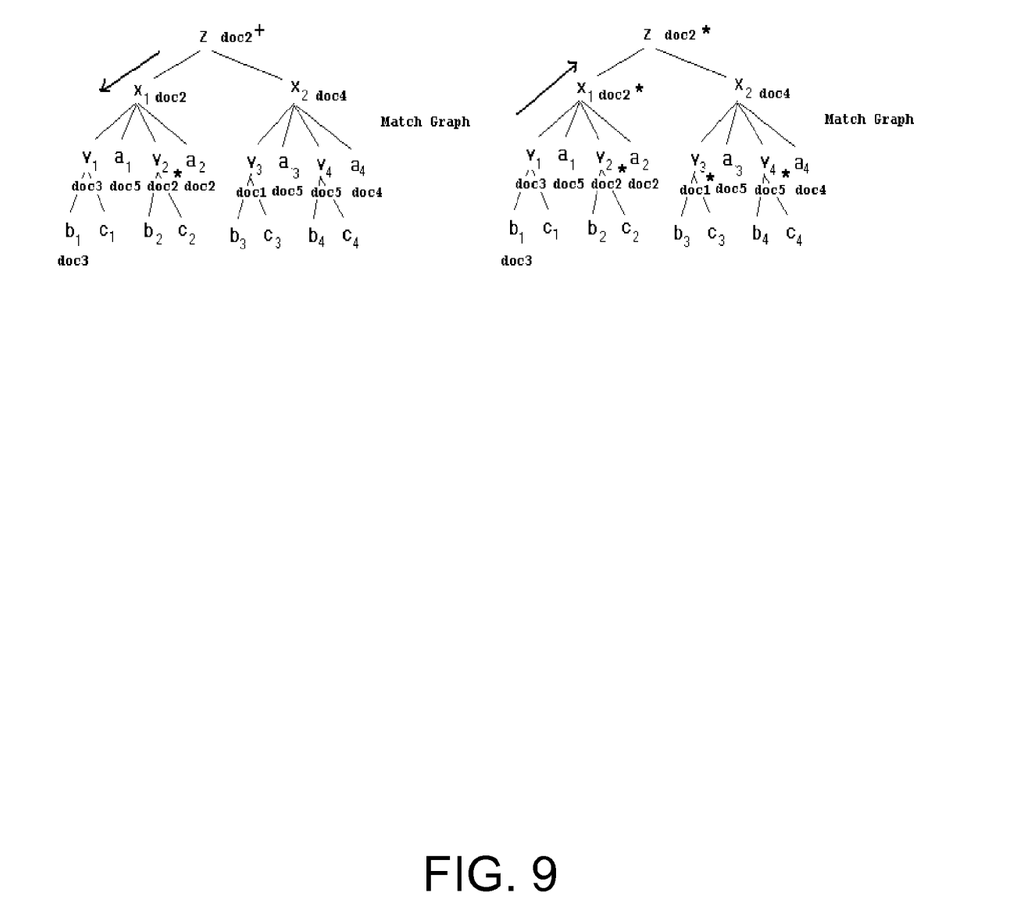
FIG. 9 is a diagram representing the functionality of the match graph during the XML pivot join procedure.

Now that all the index cursors at the leaves of the Match Graph have been advanced once (without returning results), the cursors may again be advanced. The initial match graph (the match graph on the left) in FIG. 9 now shows that the "$b_1$" index cursor has been advanced to doc3 based on the maximums of the ancestor matches. In FIG. 9, doc2+ depicts the fact that the XML pivot join procedure advanced the "z" location to some location just above doc2, so the cursors on the leaves can be advanced beyond its previous location. In other words, the location of the "z" match needs to be advanced beyond doc2. By advancing "$b_1$" to doc3, the subsequent match graph (the one on the right) in FIG. 9 is realized and the ability to compute the location of "$x_1$" based on max(min(v1, v2), min(a1, a2)) is achieved. Here we see that there is an "$a_2$," a "$b_2$," and a "$c_2$," at doc2 that have the same "$x_1$" ancestor, while "$b_2$" and "$c_2$" have the same "$v_2$" ancestor.

So, now "$x_1$" has the asterisk (*). The location of "z" is computed from min(x1, x2) and the doc2 for "z" is received. A result for the XPath //x[.//v[b and c] and .//a] may be returned because a "$b_2$" and a "$c_2$" under the same "$v_1$" has been found and the "$v_1$" and "$a_2$" have the same "$x_1$" ancestor. So, the first match for the query //x[.//v[b and c] and .//a] is document 2.

Figure 10:
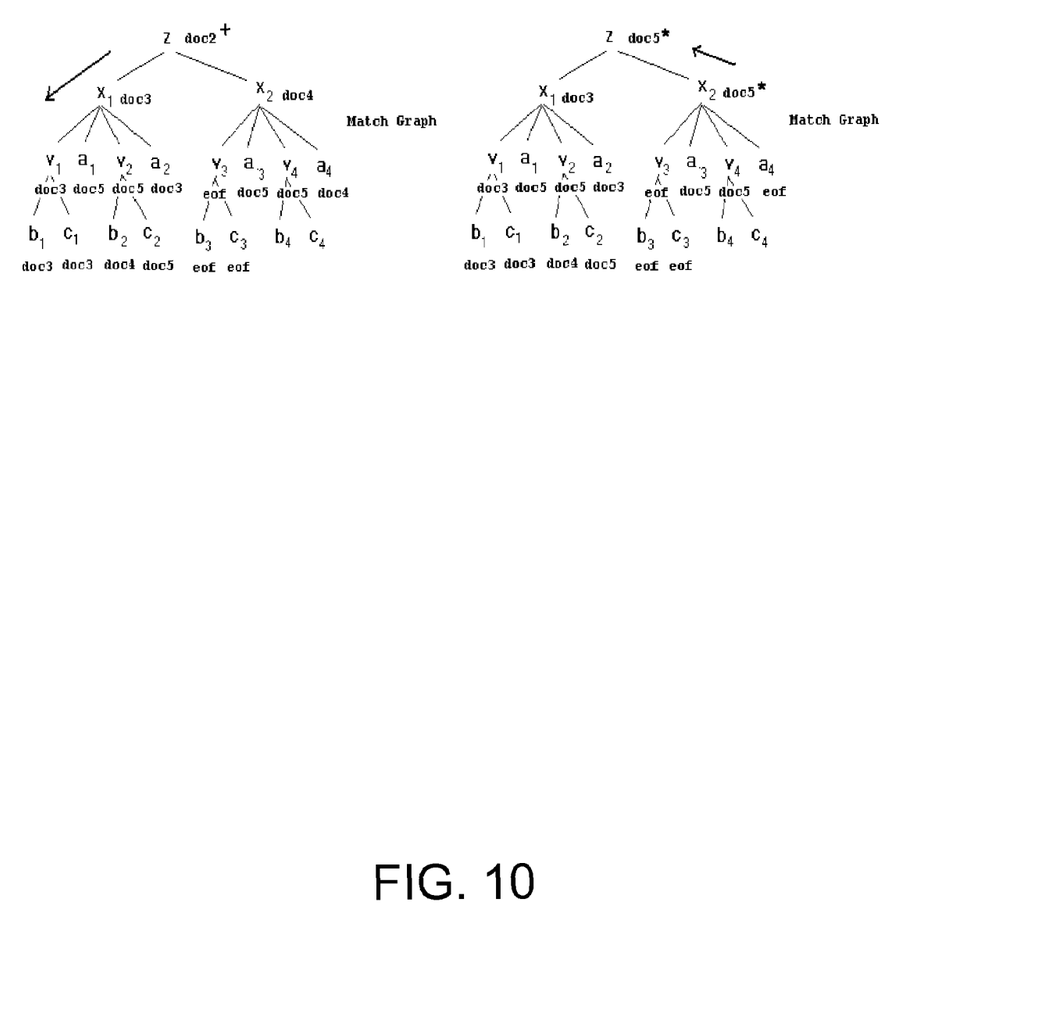
FIG. 10 is a diagram representing the functionality of the match graph during the XML pivot join procedure.

Advancing the location of "z" to doc2+ to advance the index scans is required. This time a "$b_4$" and a "$c_4$" is found at document 5 with the same "$v_4$," and an "$a_3$" at document 5 with the same "$x_2$" as "$b_4$." So, document 5 can be returned as a match for the query //x[.//v[b and c] and .//a]. This example of the XML pivot join procedure was applied to an XPath query. The XML pivot join procedure produces expected results when applied to an XPath query. However, as noted above, desired results are not produced when the XML pivot join procedure handles a LET binding used in a WHERE clause of an XQuery FLWOR expression.

Using the collection of XML documents in FIG. 6 and an XQuery FLWOR expression: "for $x in doc( ) //x LET $v in $x //v WHERE $v/b="b" and $v/c="c" and $x//a="a" RETURN $x;", the undesired results will be apparent. The expression comprises a $v binding which is a LET binding. The expression "says" that for the predicate "$v/b='b' and $v/c='c'" the "b" and "c" matches are under a sequence of one or more "v" matches. Document 3 in FIG. 6 should now qualify because "$b_1$" and "$c_1$" are under a sequence of "$v_1$" nodes under an "$x_1$," and "$a_2$" is under the same "$x_1$." When applied to the XPath query, the XML pivot join procedure properly skipped Document 3 because "$b_1$" and "$c_1$" for Document 3 are not under the same "$v_1$" node. However, when applied to the XQuery FLWOR expression, Document 3 is improperly skipped.

From the foregoing discussion, Applicants assert that a need exists for a method and apparatus that properly handles a LET binding used in a WHERE clause of an XQuery FLWOR expression during an XML pivot join procedure.

SUMMARY OF THE INVENTION

The present invention has been developed in response to the present state of the art, and in particular, in response to the problems and needs in the art that have not yet been fully solved by currently available LET binding handling techniques. Accordingly, the present invention has been developed to provide an apparatus, system, and method for handling a LET binding used in a WHERE clause of an XQuery FLWOR expression during an XML pivot join procedure.

The apparatus to handle a LET binding used in a WHERE clause of an XQuery FLWOR expression during an XML pivot join procedure is provided with a plurality of modules configured to functionally execute the necessary handling steps. These modules in the described embodiments include an identification module, an incorporation module, and a rewrite module.

The apparatus, in one embodiment, is configured to receive an XQuery FLWOR expression that identifies one or more documents according to defined parameters. The apparatus may be further configured to identify a LET binding as part of the XQuery FLWOR expression.

The LET binding may comprise a context step within a WHERE clause, that indicates the originating location of the steps occurring after and relating to the context step.

The apparatus is further configured, in one embodiment, to identify one or more logical expressions within the WHERE clause. The logical expression may include next expression steps which are separated by logical operators. The apparatus may be further configured to incorporate a replication of the LET binding with each next expression step. This incorporation produces an XPath predicate. In one embodiment, the apparatus rewrites the XQuery FLWOR expression into an XPath query. The rewrite process may include using the FOR binding of the XQuery FLWOR expression as a context step. This context step may be included with each replicated LET binding to create the XPath predicate.

During the XML pivot join procedure, the apparatus may be configured to modify a query tree by replicating depicted next steps of the query tree below the LET binding. For example, given a parent "v" as a LET binding with child nodes "b" and "c," the modified query tree would depict one "v" node with a "b" child and another "v" node with a "c" child as shown in the query tree modification of FIG. 11. In a further embodiment, this modified query tree is combined with a paths tree to form a match graph. The match graph may be utilized to facilitate rewriting the expression. A method of the present invention is also presented for handling a LET binding used in a WHERE clause of an XQuery FLWOR expression during an XML pivot join procedure. The method in the disclosed embodiments substantially includes the steps necessary to carry out the functions presented above with respect to the operation of the described apparatus. In one embodiment, the method includes receiving an XQuery FLWOR expression. The XQuery FLWOR expression may be configured with defined parameters for identifying an XML document.

The method also may include identifying a LET binding of the XQuery FLWOR expression. In one embodiment, the LET binding includes a context step in the WHERE clause. In a further embodiment, the method includes identifying one or more logical expressions within the WHERE clause. The logical expression may include one or more next expression steps separated by logical operators. The method may also include incorporating a replication of the LET binding with each next expression step. The incorporation of every replicated LET binding provides an XPath predicate.

In a further embodiment, the method includes rewriting the XQuery FLWOR expression into an XPath query using the FOR binding of the XQuery FLWOR expression as a context step followed by the XPath predicate. The method may further include replicating a predicate of the LET binding with each replication of the LET binding to create the XPath predicate. The method may further include modifying a query tree that was created during the XML pivot join procedure by replicating depicted next steps of the query tree below the LET binding. For example, given a parent "v" as a LET binding with child nodes "b" and "c," the modified query tree would depict one "v" node with a "b" child and another "v" node with a "c" child as shown in the query tree modification of FIG. 11. In a further embodiment, this modified query tree may be combined with a paths tree to form a match graph. The match graph may be utilized to facilitate rewriting the expression.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
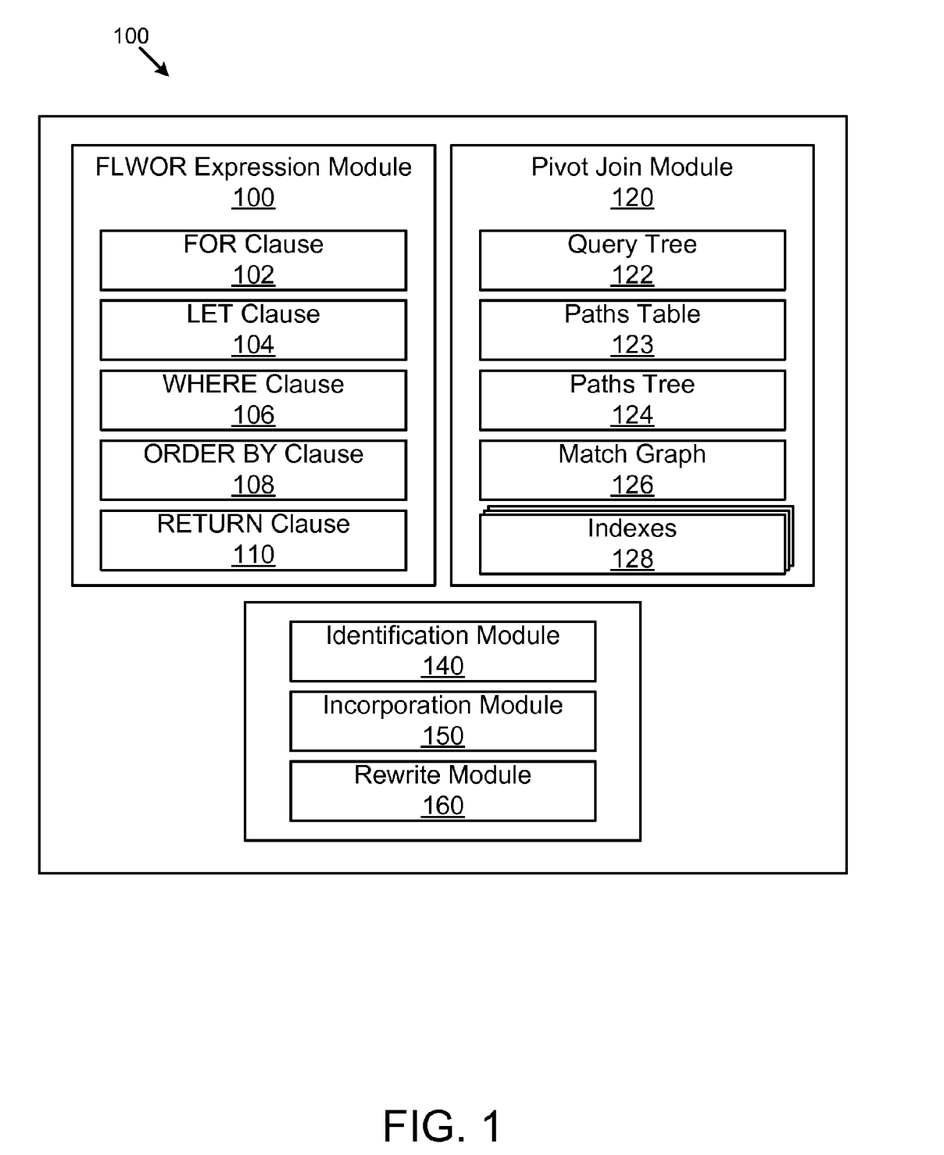
FIG. 1 is a schematic block diagram illustrating one embodiment of an environment for handling a LET binding used in a WHERE clause of an XQuery FLWOR expression during an XML pivot join in accordance with the present invention.

FIG. 1 depicts an apparatus for handling a LET binding used in a WHERE clause of an XQuery FLWOR expression during an XML pivot join procedure. The apparatus 100 includes a FLWOR expression module 101, a pivot join module 120, an identification module 140, a link module 150, a truncation module 160, and a return module 170. The depicted apparatus 100 facilitates handling a LET binding of an XQuery FLWOR expression during an XML pivot join procedure.

The FLWOR expression module 101 may include modules corresponding to a FOR clause 102, a LET clause 104, a WHERE clause 106, an ORDER BY clause 108, and a RETURN clause 110. In one embodiment, the FLWOR expression module 101 provides clauses that support iteration and binding of variables to intermediate results. The FLWOR expression module 101 is often useful for computing joins between two or more documents and for restructuring data.

The FOR clause module 102 may bind one or more variables. In one embodiment, the purpose of a FOR clause in an XQuery FLWOR expression module 101 is to produce a tuple stream in which each tuple consists of one or more bound variables. The simplest example of a FOR clause may contain one variable and an associated expression. The value of an expression associated with a variable in a FOR clause is called the binding sequence for that variable. The FOR clause module 102 may iterate over the items in the binding sequence, binding the variable to each item in turn.

When multiple variables are present, each variable may have an associated expression whose value is the binding sequence for that variable; in this case, the FOR clause module iterates each variable over its binding sequence. The resulting tuple stream contains one tuple for each combination of values in the respective binding sequences.

Like the FOR clause module 102, the LET clause module 104 may bind one or more variables. One purpose of the LET clause is to produce a tuple stream in which each tuple consists of one or more bound variables. However, unlike the FOR clause module 102, the LET clause module 104 may bind each variable to the result of its associated expression, without iteration. In one embodiment, the variable bindings generated by the LET clause are added to the binding tuples generated by the FOR clause. If there are no FOR clauses, the LET clause may produce one tuple containing all the variable bindings. Although the FOR clause module 102 and the LET clause module 104 both bind variables, the manner in which variables are bound is different.

The WHERE clause module 106 may be optional. The WHERE clause may serve as a filter for the tuples of variable bindings generated by the FOR clause and the LET clause. In one embodiment, an expression in the WHERE clause is evaluated once for each of these tuples. If the effective boolean value of the expression in the WHERE clause is true, the tuple may be retained and its variable bindings may be used in an execution of the RETURN clause module 110. If the effective boolean value of the expression in the WHERE clause is false, the tuple may be discarded.

The RETURN clause of the XQuery FLWOR expression may be evaluated once for each tuple in the tuple stream, and the results of these evaluations may be concatenated to form the result of the XQuery FLWOR expression module 101. If the ORDER BY clause is not present, the order of the tuple stream may be determined by the FOR clause and the LET clause. If the ORDER BY clause is present, it may reorder the tuples in the tuple stream into a new, value-based order. In either case, the resulting order may determine the order in which the RETURN clause is evaluated; once for each tuple, using the variable bindings in the respective tuples.

For more information regarding the XQuery FLWOR expression and the FLWOR clauses, refer to the W3C publication, *XQuery 1.0: An XML Query Language*, currently located online at http://www.w3.org/TR/xquery/.

The pivot join module 120 may provide for efficient filtering of XML documents satisfying either an XPath query or XQuery expression. In one embodiment, the pivot join module 120 uses a query tree 122, a paths table 123, a paths tree 124, a match graph 126, and XML indexes 128 to filter XML documents. From an XQuery FLWOR expression, the pivot join module 120 generates a query tree 122.

The paths table 123 may be created to describe every unique path in the collection of XML documents. The paths table 123 may include paths that are both relevant and non-relevant to the query. In one embodiment, to summarize the relevant paths, a paths tree 124 is created. In order to sort the relevant paths from the non-relevant paths, both the query tree 122 and paths table 123 may be utilized to create the paths tree 124. Entries from the paths table 123 may be matched against the query tree 122 to identify qualifying paths which are combined to form the paths tree 124. A match graph 126 may be constructed by finding paths in the paths tree 124 that match steps in the query tree 122. These structures are used at strategic points throughout the pivot join module 120 to identify qualifying documents.

XML indexes may include entries which are derived from each linear XPath in the XPath query or XQuery expression. Each index entry includes a path, which is the unique path that matched the linear XPath; a value, which is the value of the last document node in the path; a document identifier, which is the document identifier of the XML documents that contains the path; and a node identifier, which is the identifier of the node in the XML document that is in the path. There may be one XML index for each linear XPath. As a result, each particular XML index will comprise entries satisfying the corresponding linear XPath. In one embodiment, the XML indexes are logically "AND"d together to facilitate evaluation.

The identification module 140 may receive an XQuery FLWOR expression that identifies an XML document. In one embodiment, the identification module identifies a LET binding of the XQuery FLWOR expression. The LET binding may include a context step in the WHERE clause. The context step may be the originating step in the currently evaluated sequence of steps. The identification module may identify one or more logical expression within the WHERE clause. The logical expressions may include next expression steps separated by logical operators.

In one embodiment, the incorporation module is configured to incorporate a replication of the LET binding with each next expression step within the WHERE clause. The incorporation of replicated LET bindings and next expression steps may provide an XPath predicate. A predicate may include an expression enclosed in square brackets that serves to filter a sequence. The rewrite module may be configured to utilize the XPath predicate. The rewrite module may rewrite the XQuery FLWOR expression into an XPath query by using the FOR binding of the XQuery FLWOR expression as a context step and appending the XPath predicate. By rewriting the XQuery FLWOR expression into an XPath query, the current implementation of the XML pivot join procedure will produce expected results.

In another embodiment, the incorporation module is configured to incorporate a replication of a predicate of the LET binding with each replicated LET binding to create the XPath predicate. The predicate of the LET binding may be substantially unaltered and simply replicated. The rewrite module may further include replicating a query tree starting with the LET binding. For example, in FIG. 11, the query tree on the left of the arrow indicates one LET binding "v" with two child nodes "b" and "c." The modified query tree on the right of the arrow indicates the replicated LET binding "v" with the child node "b" descending from one "v" node and the child node "c" descending from the other "v" node.

The rewrite module may further be configured to combine the modified query tree and paths tree to form a modified match graph. The modified match graph may indicate the replicated LET bindings within the modified query tree to facilitate rewriting the XQuery FLWOR expression into an XPath query.

Figure 11:
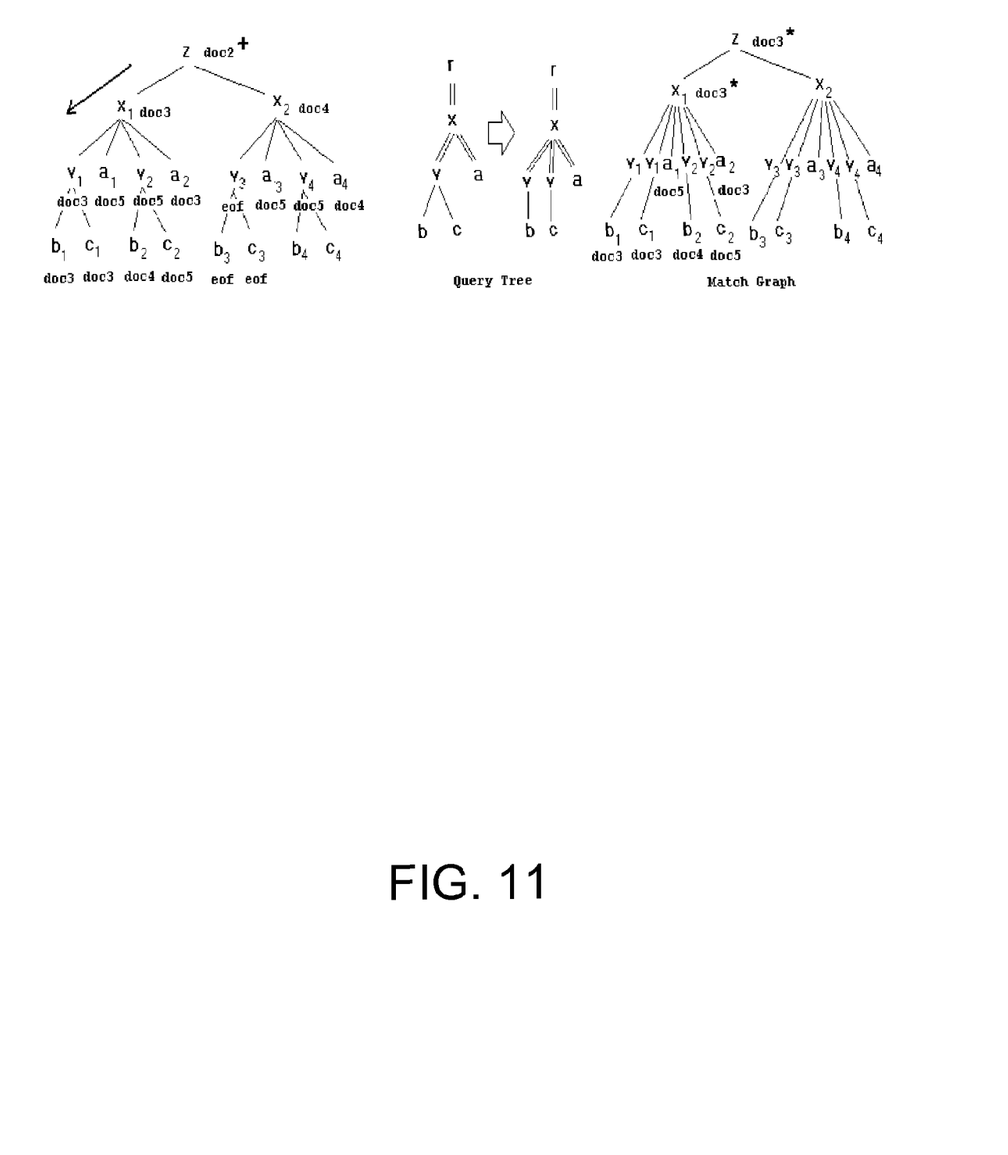
FIG. 11 is a diagram representing a match graph and query tree and the modified query tree and modified match graph that follow in accordance with the present invention.

To give an example, provided the XQuery FLWOR expression: "FOR $x in doc( ) //x LET $v in $x//v WHERE $v/b='b' and $v/c='c' and $x//a='a' RETURN $x;." The query tree may be modified as indicated in FIG. 11. Using the modified query tree and the paths tree from FIG. 4, the resulting modified match graph will be created. Thus, the semantically equivalent XPath query "//x[.//v[b='b'] and .//v[c='c'] and .//a='a']" is generated. Notice that the LET binding "v" has been replicated and incorporated within each next expression step "b='b'" and "c='c'."

Another example may be seen from the XQuery FLWOR expression "FOR $x in doc( ) //x LET $v in $x//v [e='e' and f='f'] WHERE $v/b='b' and $v/c='c' and $x//a='a' RETURN $x;." The "v" LET binding is replicated and incorporated with each next expression step. The predicate of the LET binding is not altered, but appended to each incorporation of the LET binding and next expression step. So, the resulting XPath query is "//x[.//v[e='e' and f='f' and b='b'] and .//v[e='e' and f='f' and c='c'] and .//a='a']." Notice that the LET binding is replicated for each next expression step and the predicate of the LET binding is appended to each replication of the LET binding and next expression step without being substantially altered. The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
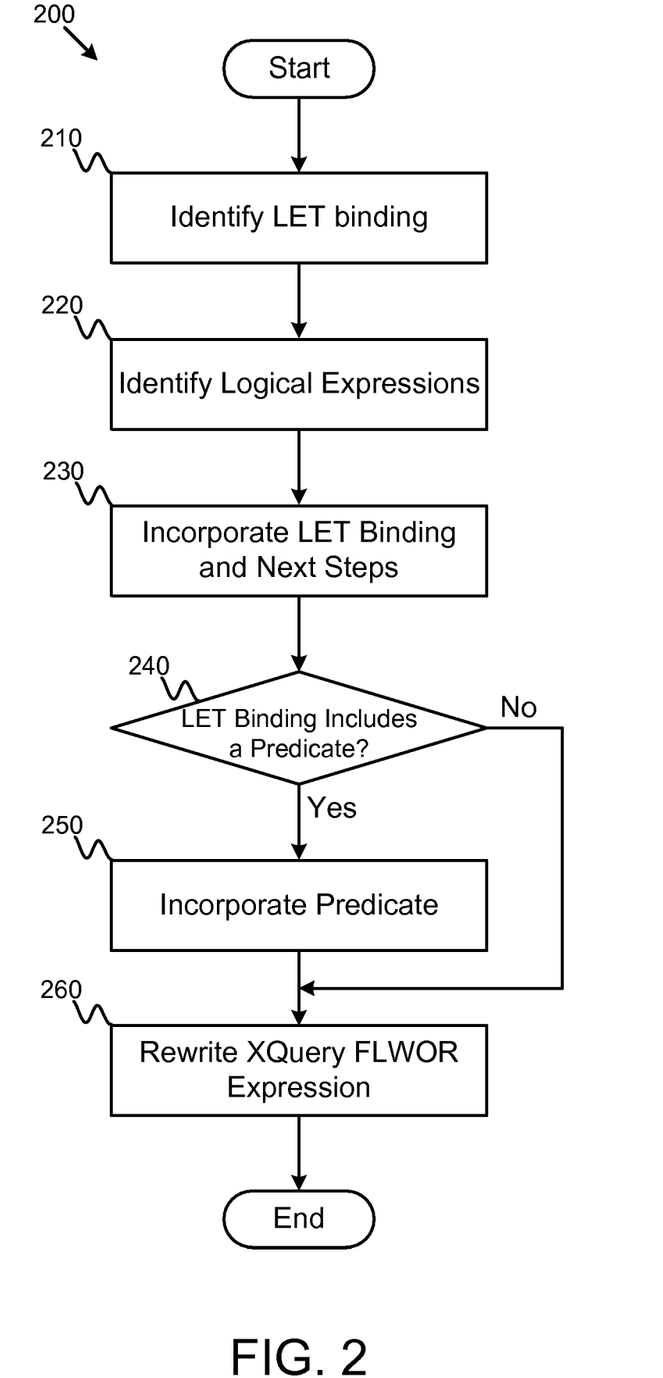
FIG. 2 is a flow chart diagram illustrating one embodiment of a method for handling a LET binding used in a WHERE clause of an XQuery FLWOR expression during an XML pivot join.
Figure 3:
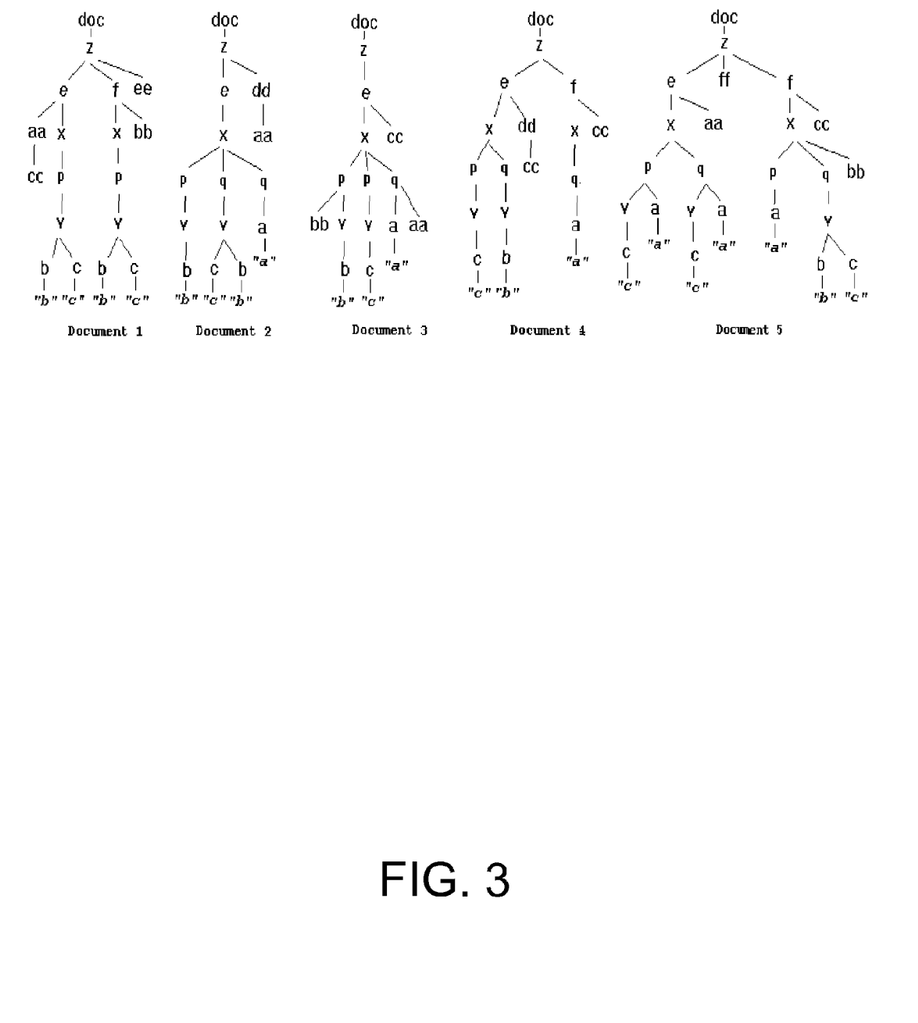
FIG. 3 is a diagram representing a collection of XML documents used in an XML pivot join procedure.

FIG. 2 depicts a schematic flow chart diagram illustrating one embodiment of handling a LET binding used in a WHERE clause of an XQuery FLWOR expression during an XML pivot join procedure in accordance with the present invention. The method 200 includes identifying 210 one or more LET bindings, identifying 220 logical expressions, incorporating 230 LET bindings and next expression steps, ascertaining 240 whether a LET binding includes a predicate, incorporating 250 the LET binding predicate, and rewriting 260 the XQuery FLWOR expression. The depicted method 200 facilitates handling a LET binding used in a WHERE clause of an XQuery FLWOR expression during an XML pivot join procedure.

Identifying 210 one ore more LET bindings may include examining the XQuery FLWOR expression to determine what variable will be bound in LET bindings. The LET binding may include a context step that identifies an originating step in the current series of advances through an XML tree.

Identifying 220 logical expressions may include examining the XQuery FLWOR expression to determine which steps will be affected by logical operations. The logical expressions may be part of the WHERE clause. If no logical operations are found in the WHERE clause of the XQuery FLWOR expression then the XML pivot join procedure may return expected results.

Incorporating 230 the LET binding and next expression steps may include obtaining the LET binding identified by the identifying operation 210. Incorporating the LET binding and the next expression steps may include replicating the LET binding for each next expression step. A LET binding may be incorporated with each next expression step to provide an XPath predicate.

Ascertaining 240 whether a LET binding includes a predicate may include examining the XQuery FLWOR expression to determine if there is a predicate of the LET binding. A predicate may include an expression enclosed in square brackets. So, identification of a LET binding predicate may include identifying an expression within square brackets in the LET clause.

If a predicate of the LET binding exists, then incorporating 250 the predicate includes appending the predicate of the LET binding for each replicated LET binding combined with a next step to provide the XPath predicate. The predicate of the LET binding may be, and is preferably, substantially unaltered after being incorporated. The predicate of the LET binding may be appended or prepended to the next expression step with the replicated LET binding as the context step to create the XPath predicate.

Rewriting 260 the XQuery FLWOR expression may include creating a semantically equivalent XPath query so that the XML pivot join procedure will produce expected results. Rewriting 260 may include using the FOR binding of the XQuery FLWOR expression as a context step of the XPath query. The context step and the XPath predicate may be combined to form the XPath query. Rewriting 260 may include replicating the query tree of the XML pivot join procedure by replicating the LET binding for each next step, so each LET binding has one child in the query tree. In one embodiment, rewriting 260 includes combining the modified query tree and paths tree to create a modified match graph to facilitate rewriting the XQuery FLWOR expression.

The present invention rewrites an XQuery FLWOR expression into an XPath query so the XML pivot join procedure can correctly return XML documents. Currently, the XML pivot join procedure does not handle a LET binding used in a WHERE clause of an XQuery FLWOR expression with accurate results. However, the current implementation of the XML pivot join procedure is capable of producing accurate results when handling an XPath query. Therefore, by rewriting the XQuery FLWOR expression that uses a LET binding in a WHERE clause into a semantically equivalent XPath query, accurate results are achieved.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable storage medium having computer usable program code programmed to perform handling of a LET binding during an XML pivot join procedure, the computer program product having operations comprising:
   receiving an Xquery "FOR, LET, WHERE, ORDER BY, and RETURN" ("FLWOR") expression for identifying at least one XML document that matches the XQuery FLWOR expression;
   identifying a LET binding of the XQuery FLWOR expression, wherein the LET binding comprises a context step in a WHERE clause within the XQuery FLWOR expression;
   identifying at least one logical expression within the WHERE clause, the at least one logical expression comprising next expression steps separated by logical operators;
   incorporating a replication of the LET binding with each next expression step within the WHERE clause to provide an XPath predicate;
   replicating a query tree of the XML pivot join procedure staffing with the LET binding and combining the query tree with a paths tree to form a match graph, the query tree comprising each replication of the LET binding, the match graph indicating each replication of the LET bindings within the query tree; and
   rewriting, based at least in part on the match graph, the XQuery FLWOR expression into an XPath query using the FOR binding of the XQuery FLWOR expression as a context step followed by the XPath predicate.

2. The computer program product of claim 1, wherein rewriting the XQuery FLWOR expression further comprises incorporating a replication of a predicate of the LET binding with each replicated LET binding to provide the XPath predicate.

3. The computer program product of claim 1, wherein rewriting the XQuery FLWOR expression further comprises replicating the query tree by replicating the LET binding for every next step of the WHERE clause.

4. An apparatus for handling a LET binding during an XML pivot join, the apparatus comprising:

an identification module stored on a memory and executed by a processor, the identification module configured to receive an XQuery "FOR, LET, WHERE, ORDER BY, and RETURN" ("FLWOR") expression for identifying at least one XML document that matches the XQuery FLWOR expression;

the identification module further configured to identify a LET binding of the XQuery FLWOR expression, wherein the LET binding comprises a context step in a WHERE clause within the XQuery FLWOR expression;

the identification module further configured to identify at least one logical expression within the WHERE clause, the at least one logical expression comprising next expression steps separated by logical operators;

an incorporation module configured to incorporate a replication of the LET binding with each next expression step within the WHERE clause to provide an XPath predicate;

a rewrite module configured to replicate a query tree of the XML pivot join procedure starting with the LET binding and combining the query tree with a paths tree to form a match graph, wherein replicating the query tree comprises replicating the LET binding for every next step of the WHERE clause, the query tree comprising each replication of the LET binding such that each replication of the LET binding comprises a single child in the query tree, the match graph indicating each replication of the LET bindings within the query tree; and the rewrite module further configured to rewrite, based at least in part on the match graph, the XQuery FLWOR expression into an XPath query using the FOR binding of the XQuery FLWOR expression as a context step followed by the XPath predicate.

5. The apparatus of claim 4, wherein the incorporation module is further configured to incorporate a replication of a predicate of the LET binding with each replicated LET binding to provide the XPath predicate.

* * * * *